March 12, 1929.　　　R. STRESAU　　　1,704,846
METHOD OF AND APPARATUS FOR ELECTRICALLY WELDING
PIPE COUPLINGS IN A CONTINUOUS OPERATION
Filed Sept. 1, 1923
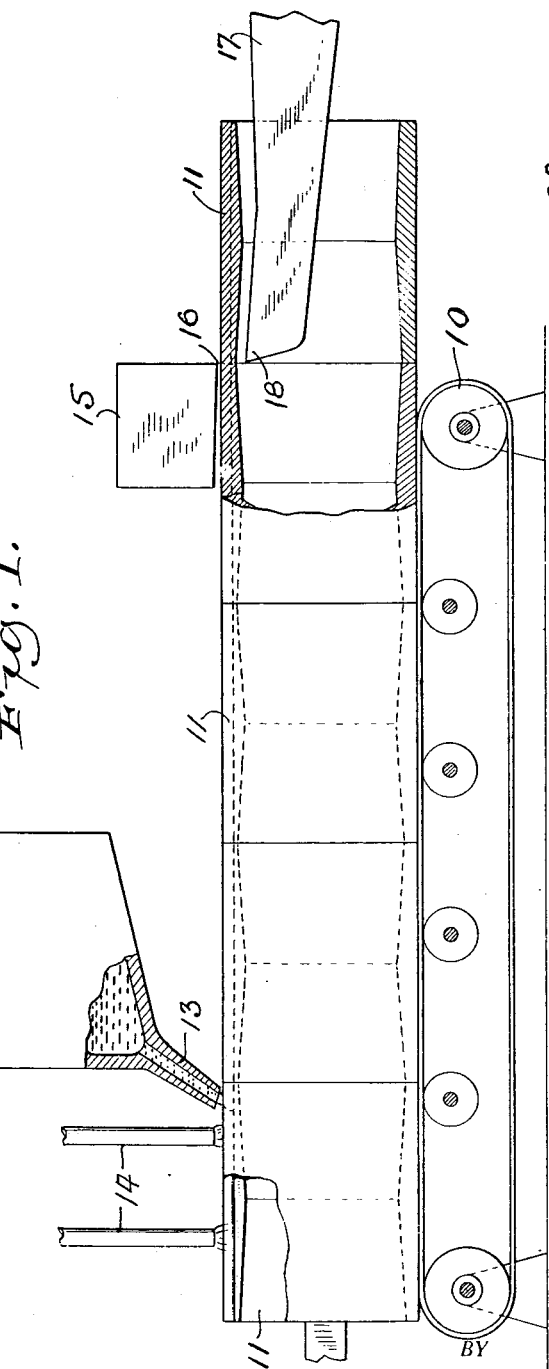
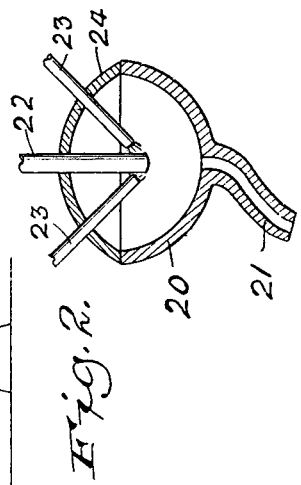
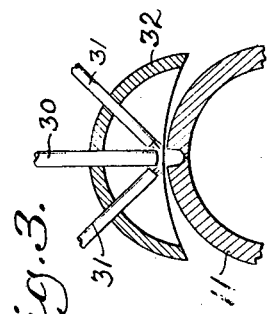
INVENTOR:
Richard Stresau, Patented Mar. 12, 1929.

1,704,846

UNITED STATES PATENT OFFICE.

RICHARD STRESAU, OF WAUWATOSA, WISCONSIN, ASSIGNOR TO A. O. SMITH CORPORATION, OF MILWAUKEE, WISCONSIN, A CORPORATION OF NEW YORK.

METHOD OF AND APPARATUS FOR ELECTRICALLY WELDING PIPE COUPLINGS IN A CONTINUOUS OPERATION.

Application filed September 1, 1923. Serial No. 660,462.

In the manufacture of pipe couplings of large diameter, such as are used for connecting the ends of the lengths of pipe employed in deep well drilling, it is now the practice to form such couplings from metal plates by converting them into circular form with the ends of the plates in abutting relation so as to present their meeting edges in such proximity as to constitute a line along which the welding operation is performed to complete the coupling as an integral structure.

The dimensions of the plate are determined by the diameter of the coupling which is produced therefrom, with due consideration of the strains which it will be required to sustain in actual use. By reason of the thickness of the metal plates used in the manufacture of such couplings, and by reason of the inherent difficulty in fusing the metal by an electric arc to the depth necessary to enable the production of a satisfactory welded joint at the meeting ends of the plate in the tubular shape into which it has been converted, it is now the practice to reduce the thickness of the metal at the welding line so as to form a groove having at its bottom a greatly thinned area of metal which may easily be brought into the desired state of fusion by application of an electric arc.

The welding groove may be produced in any convenient manner, and by the deposit of welding material in the form of molten metal, the welding groove is filled and the symmetry of the coupling restored.

In the present practice, these couplings are separately welded, an operation which involves considerable periods of idleness upon the part of the welding machine, with a consequent limitation upon the quantity of work which may be produced in a given time.

The purpose of the present invention is to enable the welding to be carried on as a continuous operation, so that the loss of time which is a factor in quantity production may be eliminated, and the output in any given time be greatly increased.

I achieve these results by feeding the couplings end to end in slow procession through an apparatus constructed so as to pre-heat the metal of the couplings in the region of the welding groove and create a state of welding fusion of the metal. While in such state of fusion, additional welding material in a molten state is allowed to flow into the groove and fill the same, and restore the contour of the coupling.

Inasmuch as the fusing and pouring operations are continuous, the couplings will be united to each other in the line of their successive welding by the welding material which has been allowed to flow in an unbroken stream. It is therefore necessary to separate the couplings, and this is done automatically after a movement or time interval sufficient to enable the fused parts and the molten welding material to change from a liquid to a solid state.

The invention also relates to the welding of couplings which have been previously formed with a deep welding groove and contemplates the fusing of the metal of the coupling in the region of the groove, and by means operating independently of the fusing means, filling the groove with molten welding material, to complete the contour of the coupling and produce an integral structure.

Some of the means which may be used and the operations performed in carrying out my invention will now be described, and the novelty thereof will be pointed out in the appended claims.

In the accompanying drawing:

Figure 1 is a view in side elevation, parts being shown in section, of an apparatus by means of which my invention may be practiced, as will be later explained.

Figure 2 is a sectional view of a modified form of melting pot or furnace in which the welding material may be reduced to liquid state and supplied to the welding groove.

Fig. 3 is a similar view showing a further modification in the manner of supplying the welding material to the welding groove.

Referring to Fig. 1 of the drawing, the numeral 10 indicates a traveling conveyor of suitable construction and adapted to support and convey a line of couplings 11 arranged end to end with the welding grooves formed in the couplings in alignment. The traveling conveyor is actuated by any suitable devices so as to impart a continuous but slow forward feeding movement to the couplings.

A crucible 12, preferably in the form of an electric furnace, containing the molten metal which constitutes the welding metal is supported with its spout 13 in position to direct the molten metal flowing from the crucible into the welding groove in the succession of couplings. At a point slightly in advance of the spout of the crucible, one or more electrodes 14 are positioned so that the electric current flowing therethrough will heat the metal of the couplings in the region of the groove. In order that the best results may be achieved, this pre-heating should bring the metal of the couplings in such region into practically a state of fusion, so that the molten metal flowing from the crucible will readily unite with the same and effect a substantial weld. The rate of travel of the couplings and the flow of the metal will be carefully proportioned, having in mind the attainment of the results desired.

The couplings in the succession, by reason of their end-to-end arrangement, are united in the line of the weld by a continuous strip of metal produced in the welding operation, which strip in cross section is approximately that of the welding groove. In the further forward movement of the succession of couplings past the point of welding the fused metal hardens, so that the several couplings are temporarily connected in the line of the weld.

It is desirable that the couplings of the succession be severed automatically upon completion of the welding, in order that the continuity of the operation may not be interfered with. To effect this result, I shear the metal strip connecting the couplings at the point of their union, and this result is achieved by passing the succession of couplings under an anvil 15 having an angular edge 16 which forms a cutting face. A power actuated lever 17, adapted to oscillate in a vertical plane is provided at its forward end with a cutting edge 18, which is designed to cooperate with the cutting edge 16 of the anvil. The lever 17 is so positioned that the forward end thereof may enter the opening in the coupling, and when in the movement of the succession of couplings the joining line between them is brought into line with the cutting edges 16 and 18, the lever 17 is actuated toward the anvil so as to effect a severance of the connecting strip at that point. In the reverse reciprocation of the lever 17, the forward end is lowered and the severed coupling is permitted to fall therefrom into an open space below the line of movement of the succession of couplings and clear thereof. The lever 17 then swings back into position to receive the next coupling, and the operations are repeated.

Although I have shown in Fig. 1 a fixed crucible or furnace in which the welding material is brought to a molten state, it is not essential to the practice of my invention that a crucible in the form shown be used. I may use instead thereof the arrangement shown in Fig. 2, in which the welding material is conducted into the welding groove in the ratio of its fusion. In Fig. 2 the numeral 20 indicates a melting pot which will be supported above the line of travel of the couplings, as before, and provided with a spout 21 adapted to direct the molten metal into the welding groove. The welding metal is supplied in the form of a metal bar or weldrod 22, the lower end of which extending into the melting pot 20 is fused by an arc formed at the end of the current conductors 23. The melting pot 20 will be lined with a highly refractory material, and the weldrod 22 will be fed into the melting pot by suitable devices known in the art in the ratio of the travel of the succession of couplings. A cover 24 may be placed over the melting pot to form a light shield.

Fig. 3 illustrates a modification of the means for supplying the welding material to the welding groove. In this arrangement a crucible or melting pot is not employed, but instead the end of the advancing weldrod 30 is fused by the arc formed by the conductors 31, so that the molten metal flowing from the weldrod is thrown directly into the welding groove. A shield 32 may be arranged over the welding line.

The pre-heating of the couplings to produce a state of fusion in the region of the grooves, is effected in all of the modified arrangements. It is also within the scope of my invention to apply to a single coupling formed with a deep welding groove the operation of fusing the metal of the coupling in the region of the welding groove, and filling the welding groove with additional molten welding material to complete the contour of the coupling and produce an integral structure.

Having thus described my invention, what I claim and desire to secure by Letters Patent of the United States, is:

1. The process of producing welded pipe couplings in a continuous operation, which consists in conveying couplings in end-to-end order with their welding grooves in alignment, fusing the couplings in the region of the groove, filling the grooves in succession with molten welding material to complete the contour of the coupling and produce an integral structure, and severing the couplings at their points of union while being so conveyed.

2. The process of producing welded pipe couplings in a continuous operation, which consists in conveying a succession of couplings arranged with their welding grooves in longitudinal alignment, filling all of the grooves with molten welding material in succession to complete the structures and temporarily unite the couplings to each other at the line of the weld, and severing the couplings at their point of union with each other.

3. An apparatus for electrically welding pipe couplings in a continuous operation, comprising a conveyor adapted to convey a succession of couplings with their welding grooves in longitudinal alignment, devices for fusing the couplings in the region of the grooves, devices adjacent the line of movement of the couplings for supplying molten welding material to the grooves to fill the latter and complete the contour of the couplings, and means for severing the couplings from each other.

4. An apparatus for electrically welding pipe couplings in a continuous operation, comprising a conveyor adapted to convey a succession of couplings with their welding grooves in longitudinal alignment, devices adjacent the line of movement of the couplings for supplying molten welding material to the grooves to fill the latter and complete the contour of the couplings, and means for severing the couplings from each other.

5. An apparatus for electrically welding a pipe coupling provided with a previously formed deep welding groove, such apparatus comprising means for fusing the metal of the coupling in the region of the groove, and a container having an outlet adapted to supply molten welding material to the groove to fill the same and complete the contour of the coupling and produce an integral structure.

In testimony whereof, I have signed my name at Milwaukee, this 30th day of August, 1923.

R. STRESAU.